US010110762B2

(12) United States Patent
Tajima et al.

(10) Patent No.: US 10,110,762 B2
(45) Date of Patent: Oct. 23, 2018

(54) DISPLAY CONTROL DEVICE FOR DISPLAYING A SCREEN DEPENDING ON THE SIZE OF A DISPLAY SURFACE, METHOD FOR DISPLAYING CONTROL DEVICE, METHOD FOR DISPLAYING A SCREEN DEPENDING ON THE SIZE OF A DISPLAY SURFACE, AND COMPUTER-READABLE STORAGE MEDIUM FOR COMPUTER PROGRAM

(71) Applicant: KONICA MINOLTA, INC., Chiyoda-ku, Tokyo (JP)

(72) Inventors: Hiroki Tajima, Toyokawa (JP); Kazuaki Tomono, Okazaki (JP); Tadashi Suzue, Hachioji (JP); Taiju Inagaki, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/190,235

(22) Filed: Jun. 23, 2016

(65) Prior Publication Data

US 2017/0013149 A1    Jan. 12, 2017

(30) Foreign Application Priority Data

Jul. 10, 2015   (JP) ................................. 2015-138401

(51) Int. Cl.
| | | |
|---|---|---|
| *H04N 1/00* | (2006.01) | |
| *G06F 3/14* | (2006.01) | |
| *G06F 17/21* | (2006.01) | |

(52) U.S. Cl.
CPC ....... *H04N 1/00503* (2013.01); *G06F 3/1454* (2013.01); *G06F 17/212* (2013.01);
(Continued)

(58) Field of Classification Search
None
See application file for complete search history.

(56) References Cited

U.S. PATENT DOCUMENTS

2009/0310180 A1    12/2009  Uchida et al.
2011/0138422 A1*    6/2011  Shintani ............. H04N 5/44543
                                                725/44
(Continued)

FOREIGN PATENT DOCUMENTS

CN      102200447 A       9/2011
JP      2009-302890 A    12/2009
(Continued)

OTHER PUBLICATIONS

The extended European Search Report dated Nov. 17, 2016, by the European Patent Office in corresponding European Patent Application No. 16176848.6-1903. (7 pages).
(Continued)

*Primary Examiner* — Thomas D Lee
(74) *Attorney, Agent, or Firm* — Buchanan Ingersoll & Rooney PC

(57) ABSTRACT

A display control device for displaying a screen in a display unit is provided. The display control device includes an obtaining portion configured to obtain size data indicating a size of a display surface of the display unit; and a processor configured to determine whether the size of the display surface is larger or smaller than a predetermined size based on the size data, to display a first screen including first objects in the display unit when the size of the display surface is larger than the predetermined size, and to display a second screen including second objects in the display unit when the size of the display surface is smaller than the predetermined size. The second screen corresponds to the first screen. The second objects are less than the first objects,
(Continued)

and each of the second objects corresponds to any one of the first objects.

23 Claims, 16 Drawing Sheets

(52) U.S. Cl.
CPC ..... *H04N 1/00222* (2013.01); *H04N 1/00381* (2013.01); *H04N 1/00408* (2013.01); *G09G 2340/04* (2013.01); *G09G 2340/145* (2013.01); *G09G 2354/00* (2013.01)

(56) References Cited

U.S. PATENT DOCUMENTS

| 2011/0238287 | A1 | 9/2011 | Hayashi |
| 2012/0327443 | A1 | 12/2012 | Fujii |
| 2013/0127918 | A1* | 5/2013 | Kang ................ G06F 3/0481 345/660 |
| 2013/0159841 | A1* | 6/2013 | Yokoyama ......... H04N 1/00411 715/243 |
| 2013/0326337 | A1 | 12/2013 | Lehmann et al. |
| 2013/0328746 | A1* | 12/2013 | Fujita .................... G06F 3/1454 345/2.2 |
| 2014/0229818 | A1 | 8/2014 | Goswami |
| 2015/0172486 | A1 | 6/2015 | Motosugi et al. |

FOREIGN PATENT DOCUMENTS

| JP | 2010-093777 A | 4/2010 |
| JP | 2010-278967 A | 12/2010 |
| JP | 2013-130964 A | 7/2013 |
| JP | 2014-035555 | 2/2014 |

OTHER PUBLICATIONS

Notification of Reasons for Refusal issued in corresponding Japanese Patent Application No. 2015-138401, dated Aug. 8, 2017, with English Translation (8 pages).

"jQuery Mobile Smart Phone App. Kaihatsu" by Takashi Okamoto et al. Japan, Softbank Creative Corp. on Jun. 26, 2012; the 1st edition, pp. 117-121 (5 pages).

"Jyokyu-Sha-Mmuke Web Site No Tsukuri-Kata web design no kihon chishiki" Mac People 2014.8, Japan, KADOKAWA Corporation, on Jun. 28, 2014, vol. 20 No. 8, pp. 99-102 (4 pages).

"WP sumaho-you tema de 'PC ban e no kirikae botan' wo jissou dekiru plug-in 'MW Theme Switcher on WPtap' no tsukai-kata" on Oct. 5, 2012, URL, http://meglog.net/wordpress/mw-theme-switcher-on-wptap-usage.html (6 pages).

"Responsive web design no site ni PC to smart phone no hyoji kirikae botan wo tsukete mita" by Shunji Kato,| A40, Dec. 24, 2012, URL, http://katoshun.com/blog/switch-screen.html (6 pages).

Office Action (Decision of Refusal) dated Jan. 9, 2018, by the Japanese Patent Office in corresponding Japanese Patent Application 2015-138401and partial English Translation of the Office Action. (7 pages).

First Office Action dated Apr. 28, 2018, by the State Intellectual Property Office of China in corresponding Chinese Patent Application No. 20161010520793.9 , and a partial English Translation of the Office Action. (16 pages).

\* cited by examiner

DISPLAY CONTROL DEVICE FOR DISPLAYING A SCREEN DEPENDING ON THE SIZE OF A DISPLAY SURFACE, METHOD FOR DISPLAYING CONTROL DEVICE, METHOD FOR DISPLAYING A SCREEN DEPENDING ON THE SIZE OF A DISPLAY SURFACE, AND COMPUTER-READABLE STORAGE MEDIUM FOR COMPUTER PROGRAM This application is based on Japanese patent application No. 2015-138401 filed on Jul. 10, 2015, the contents of which are hereby incorporated by reference.

BACKGROUND OF THE INVENTION

1. Field of the Invention

The present invention relates to a technology for displaying a screen in a display unit.

2. Description of the Related Art

Image forming apparatuses into which functions such as copying, network printing, faxing, scanning, and a file server function are incorporated have attained widespread use. Such an image forming apparatus is generally called a "multifunction device" or a "Multi-Functional Peripheral (MFP)".

Further, the image forming apparatuses have recently been equipped with display units having different sizes and resolution depending on the application, price, and so on thereof.

For a user, displaying a screen depending on the property of a display unit, e.g., the size of a display surface, is preferable. In view of this, the following method has been proposed.

A controller unit includes: an HDD for storing screen construction data; a determination part for detecting an alteration of an image forming apparatus, and on the basis of the detected alteration contents it is determined whether or not updating of the operation screen is necessary; a screen construction data acquisition part for acquiring from the HDD screen construction data corresponding to an operation screen after the updating; and a first communication part for transmitting the acquired screen construction data to a display unit. The display unit includes a display control part for displaying a first operation screen on a display part and a second communication part for receiving screen construction data. A creation part generates second operation screen data that is screen construction data of the second operation screen corresponding to an operation display part based on construction information; and a display control part updates the first operation screen to the second operation screen based on the second operation screen data. (English Abstract of Japanese Laid-open Patent Publication No. 2010-093777).

Meanwhile, in order to reduce the number of man-hours for developing an image forming apparatus, a possible method is to reduce the number of man-hours for developing screens to be displayed in a display unit.

According to the method described in Japanese Laid-open Patent Publication No. 2010-093777, common software can be used in image forming apparatuses with display units having different properties. This eliminates the need for developing different software for image forming apparatuses with display units having different properties. Not only that, but reduction in man-hours for development is further sought.

SUMMARY

The present disclosure has been achieved in light of such an issue, and therefore, an object of an embodiment of the present invention is to reduce the number of man-hours for developing a screen displayed in a display unit as compared with conventional technologies.

A display control device according to an aspect of the present invention is a display control device for displaying a screen in a display unit. T display control device includes an obtaining portion configured to obtain size data, the size data indicating a size of a display surface of the display unit; and a processor configured to determine whether the size of the display surface is larger or smaller than a predetermined size based on the size data, to display a first screen including first objects in the display unit when the size of the display surface is larger than the predetermined size, and to display a second screen including second objects in the display unit when the size of the display surface is smaller than the predetermined size, the second screen corresponding to the first screen, a quantity of the second objects being less than a quantity of the first objects, and each of the second objects corresponding to any one of the first objects.

These and other characteristics and objects of the present invention will become more apparent by the following descriptions of preferred embodiments with reference to drawings.

DESCRIPTION OF THE PREFERRED EMBODIMENTS

Figure 1:
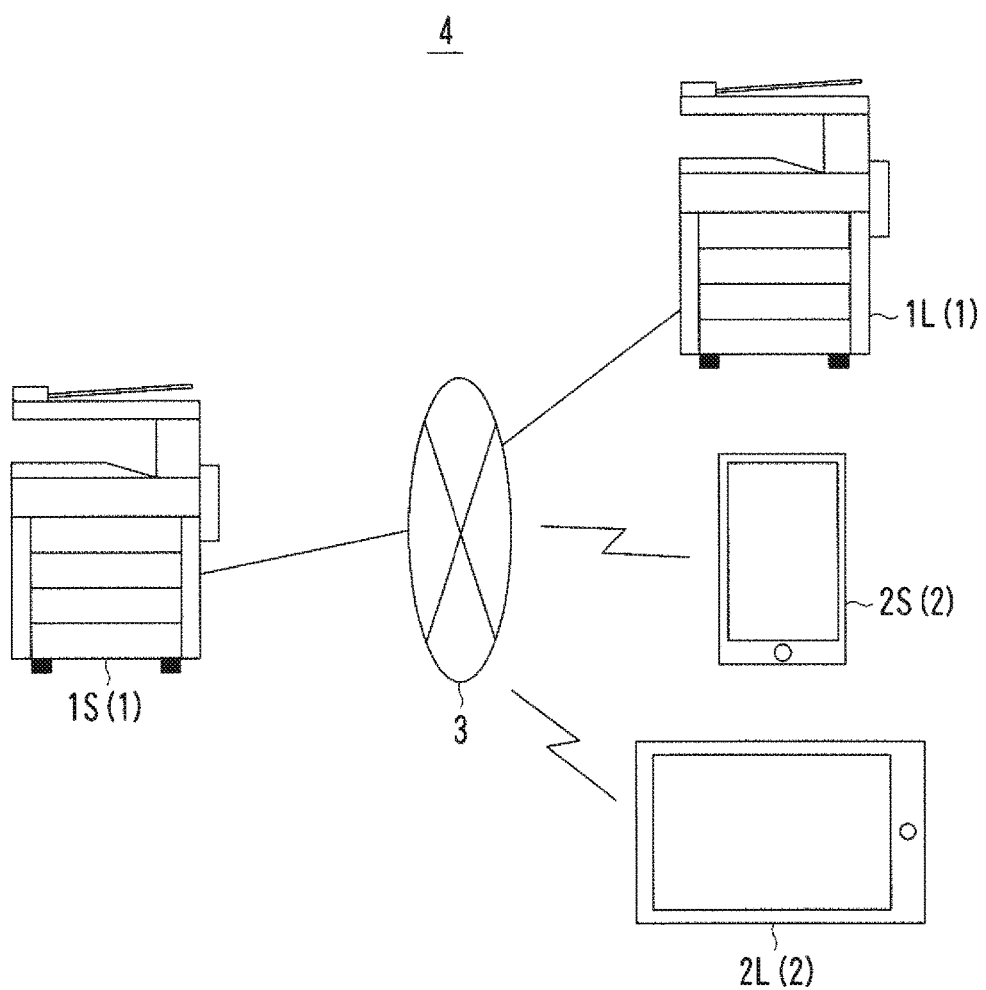
FIG. 1 is a diagram showing an example of the overall configuration of an image processing system.
Figure 2:
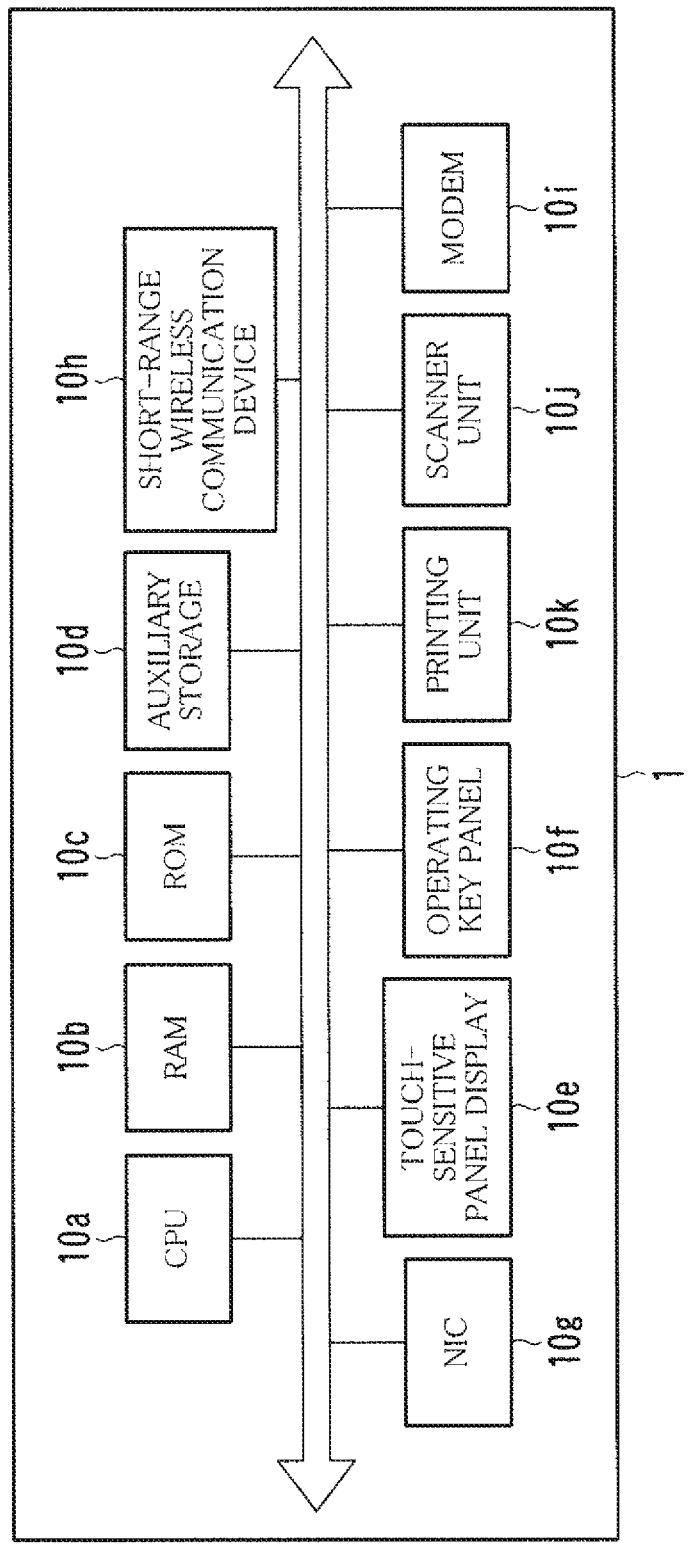
FIG. 2 is a diagram showing an example of the hardware configuration of an image forming apparatus.

FIG. 1 is a diagram showing an example of the overall configuration of an image processing system 4. FIG. 2 is a diagram showing an example of the hardware configuration of an image forming apparatus 1.

As shown in FIG. 1, the image processing system 4 is configured of a plurality of image forming apparatuses 1, a plurality of terminals 2, a communication line 3, and so on.

The image forming apparatuses 1 and the terminals 2 are configured to perform communication with one another via the communication line 3. Examples of the communication line 3 are a Local Area Network (LAN), the Internet, a landline telephone network, a mobile phone network, and a short-range radio network.

The image forming apparatus 1 is an apparatus into which functions such as copying, network printing, faxing, scanning, and a file server function are incorporated. The image forming apparatus 1 is generally called a "multifunction device" or a "Multi-Functional Peripheral (MFP)".

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a short-range wireless communication device 10h, a modem 10i, a scanner unit 10j, a printing unit 10k, and so on.

The touch-sensitive panel display be displays, for example, a screen for presenting messages to a user, a screen for allowing the user to input commands or information, a screen for showing the results of processing executed by the CPU 10a. The touch-sensitive panel display 10e also sends a signal indicating a touched location to the CPU 10a.

The size of a display surface (panel) of the touch-sensitive panel display 10e is different for each of the image forming apparatuses 1. Hereinafter, the image processing system 4 is described by taking an example in which, of the image forming apparatuses 1, an image forming apparatus 1S has the touch-sensitive panel display 10e with a display surface having a size smaller than a predetermined size (referred to as a "reference size S0" hereinafter), and an image forming apparatus 1L has the touch-sensitive panel display 10e with a display surface having a size equal to or greater than the reference size S0.

The user uses the terminal 2 to cause the same to access the image forming apparatus 1 remotely, and uses the terminal 2, instead of the touch-sensitive panel display 10e, to operate the image forming apparatus 1 remotely. Alternatively, instead of the terminal 2, the user uses another image forming apparatus 1 to cause the same to access the image forming apparatus 1 remotely to operate the image forming apparatus 1.

The operating key panel 10f is so-called a hardware keyboard. The operating key panel 10f is provided with numeric keys, a start key, a stop key, and function keys.

The NIC 10g performs communication with the other image forming apparatuses 1 or the terminals 2 in accordance with a protocol such as Transmission Control Protocol/Internet Protocol (TCP/IP).

The short-range wireless communication device 10h establishes communication using radio waves which can travel few meters to a dozen meters. Examples of the short-range wireless communication device 10h include devices complying with standards of Bluetooth (registered trademark), wireless Universal Serial Bus (USB), and so on.

The modem 10i sends and receives image data with a facsimile terminal in accordance with a protocol such as G3.

The scanner unit 10j optically reads an image recorded on a sheet placed on a platen glass to generate image data thereof.

The printing unit 10k prints, onto paper, the image captured by the scanner unit 10j and an image sent by the terminal 2 and received by the NIC 10g, the short-range wireless communication device 10h, or the modem 10i.

The ROM 10c or the auxiliary storage 10d stores, therein, a program for implementing the functions of copying and remote accessing. The ROM 10c or the auxiliary storage 10d stores, in particular, a screen display program 10P (see FIG. 3) as a program for displaying a screen in the touch-sensitive panel display be or another device.

The programs are loaded into the RAM 10b as necessary and executed by the CPU 10a. The auxiliary storage 10d is, for example, a hard disk drive or a Solid State Drive (SSD).

The terminal 2 is a client by means of which the user remotely uses the foregoing functions of the image forming apparatus 1. The terminal 2 is, for example, a personal computer, a smartphone, a tablet computer, or a mobile phone terminal. Hereinafter, an example is described in which the terminals 2 are a smartphone and a tablet computer. The smartphone and the tablet computer may be distinguished from one another as a "terminal 2S" and a "terminal 2L", respectively.

The size of the touch-sensitive panel display 20d of the terminal 2S is smaller than the reference size S0. On the other hand, the size of the touch-sensitive panel display 20d of the terminal 2L is equal to or greater than the reference size S0.

The screen display program 10P is used in common by all of the image forming apparatuses 1 including the image forming apparatus 1L and the image forming apparatus 1S. Even if the number of screens prepared is smaller than that in conventional technologies, the screen display program 10P enables a screen corresponding to the size of the touch-sensitive panel display 10e to be displayed in the touch-sensitive panel display 10e. The mechanism therefor is described below.

[Fundamentals]

Figure 3:
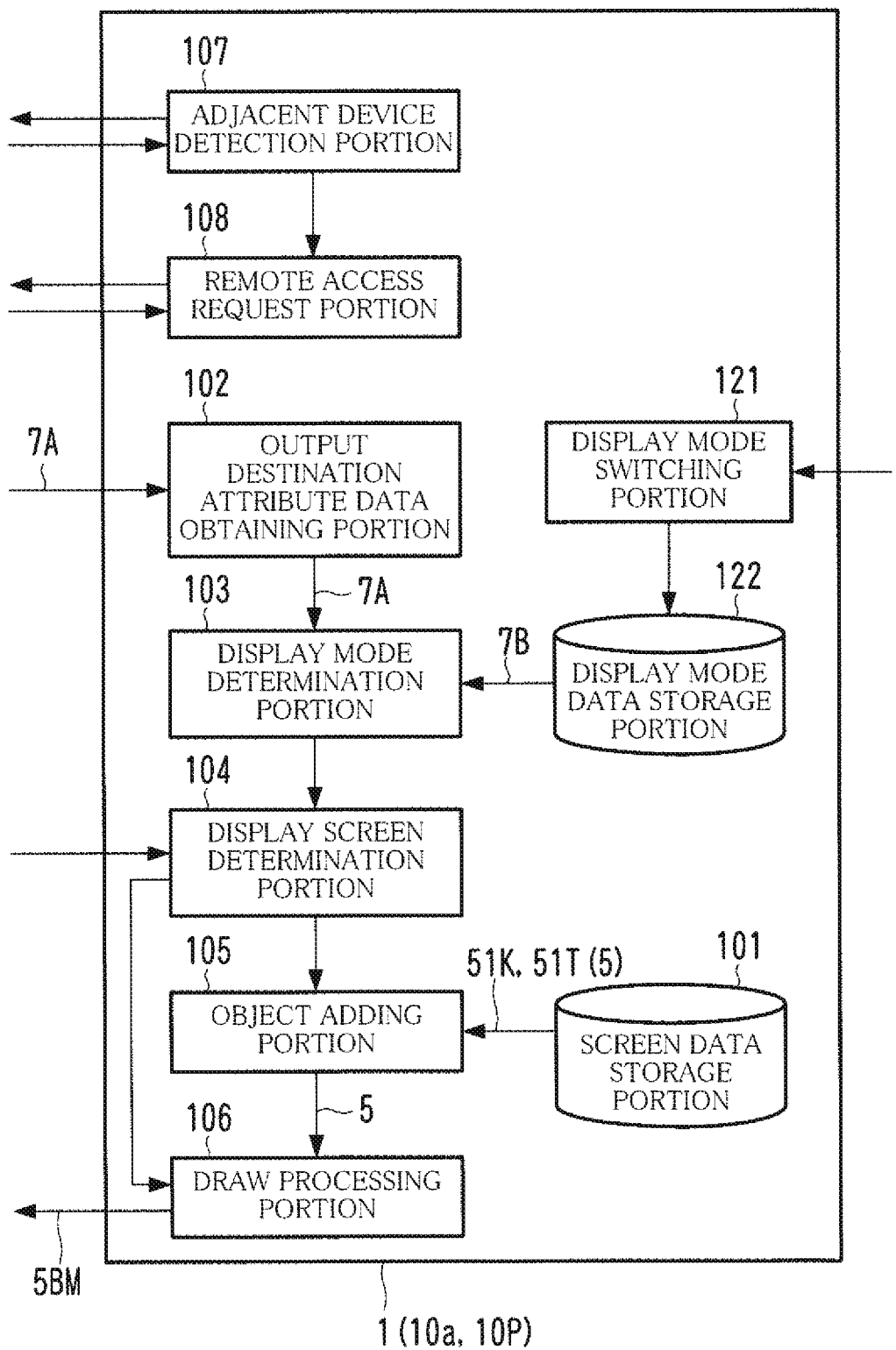
FIG. 3 is a diagram showing an example of the functional configuration of an image forming apparatus.
Figure 4:
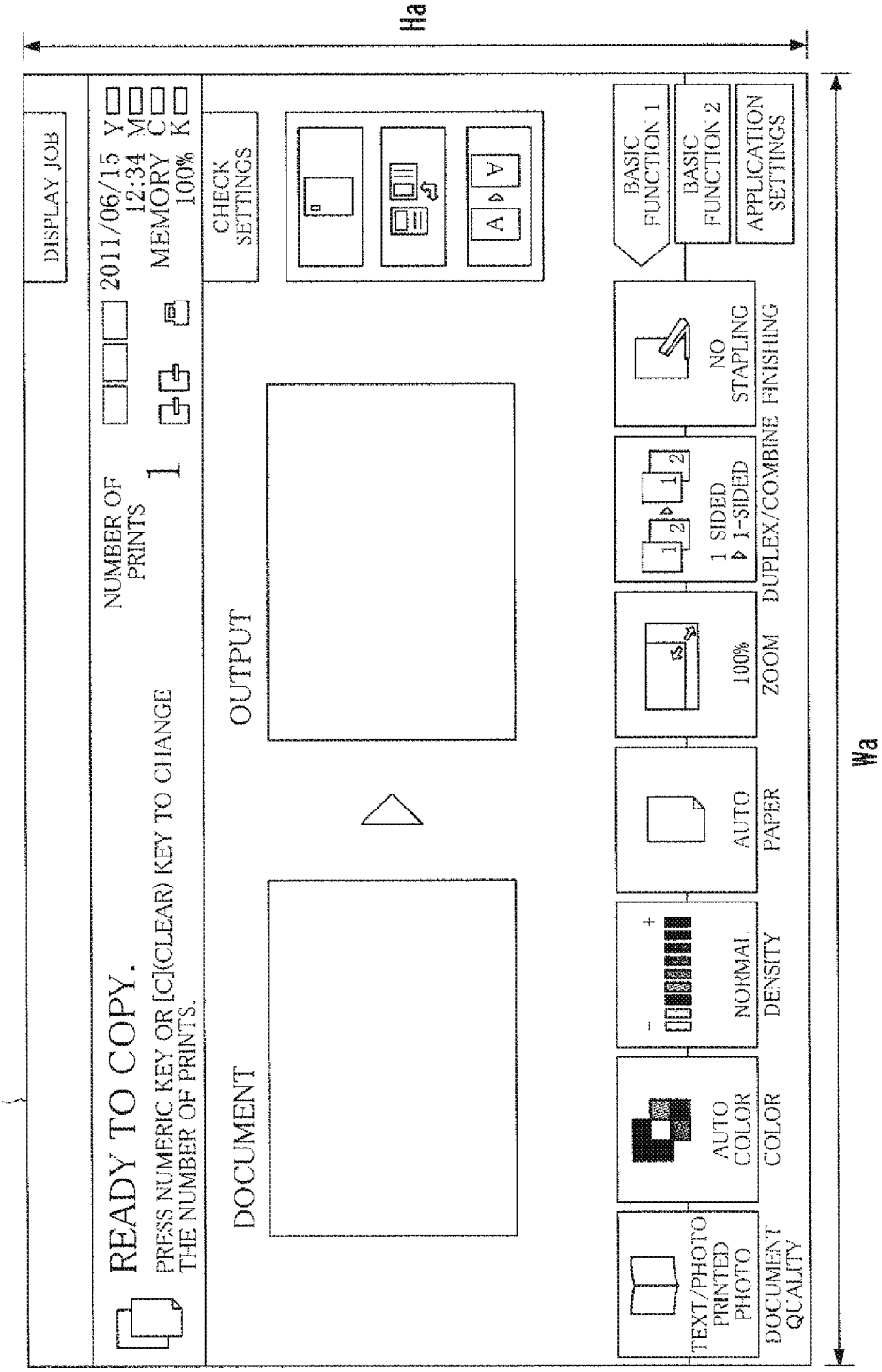
FIG. 4 is a diagram showing an example of a copy screen.
Figure 5:
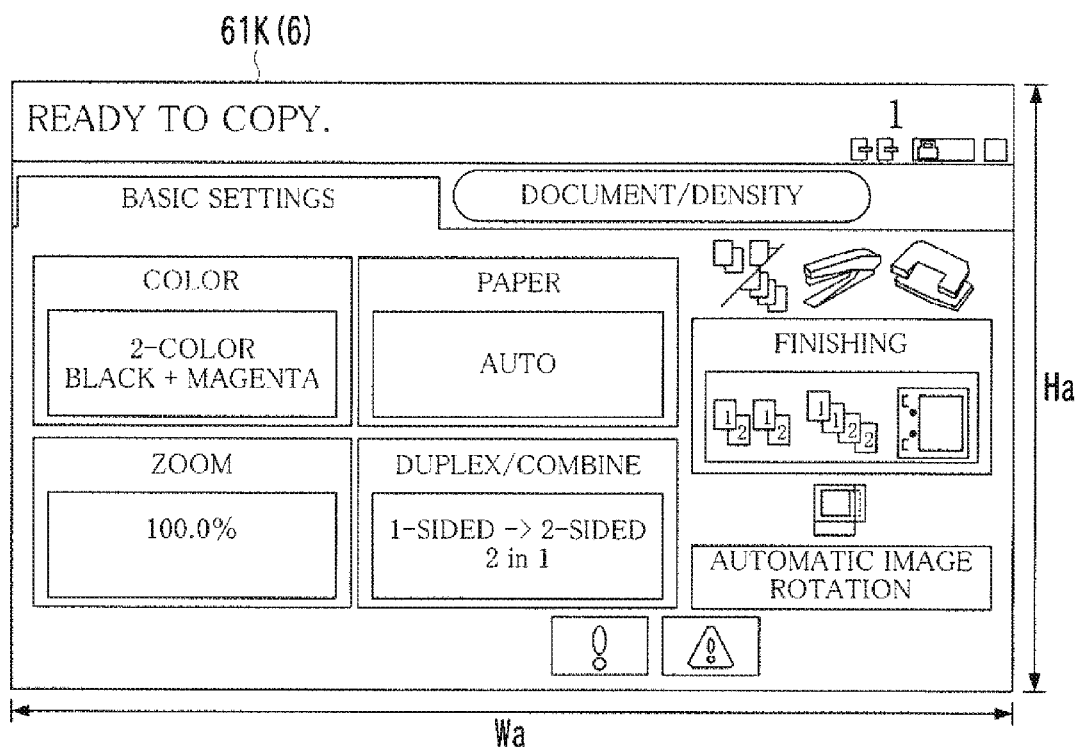
FIG. 5 is a diagram showing an example of a copy screen.
Figure 6:
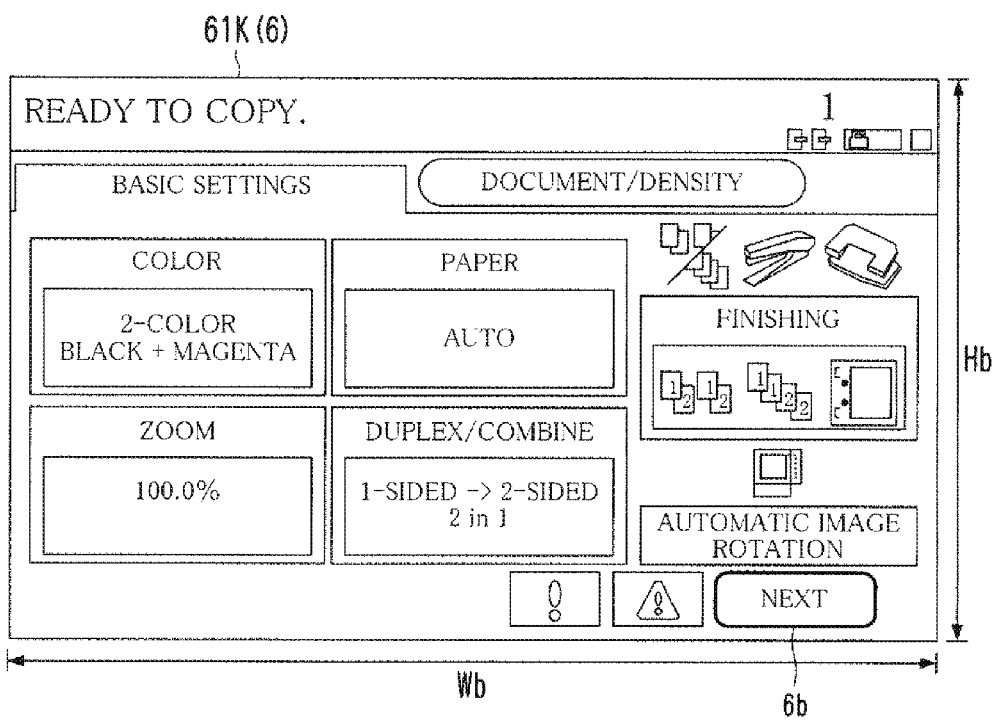
FIG. 6 is a diagram showing an example of a reduced copy screen.

FIG. 3 is a diagram showing an example of the functional configuration of the image forming apparatus 1. FIG. 4 is a diagram showing an example of a copy screen 61T. FIG. 5 is a diagram showing an example of a copy screen 61K. FIG. 6 is a diagram showing an example of a reduced form of the copy screen 61K.

The screen display program 10P implements, in the image forming apparatus 1, the functions of a screen data storage portion 101, an output destination attribute data obtaining portion 102, a display mode determination portion 103, a display screen determination portion 104, an object adding portion 105, a draw processing portion 106, an adjacent device detection portion 107, a remote access request portion 108, a display mode switching portion 121, a display mode data storage portion 122, and so on, all of which are shown in FIG. 3.

In the meantime, the image forming apparatus 1L, has two display modes of a normal mode and an expansion mode.

In the "normal mode", a screen is displayed which is designed to arrange objects of a letter, a button, and a tab in a normal (standard, general) size. The size is easy enough for a person with normal eyesight to recognize the objects from a position about one meter away from the screen. However, the size is not enough for a person with poor eyesight to recognize the objects.

In the "expansion mode", a screen is displayed which is designed to arrange the objects in a size larger than that in the normal mode, so that even a person with poor eyesight can recognize the objects. In short, the screen for expansion mode is designed to improve the accessibility. The expansion mode is suitable not only for a person with poor eyesight but also for an elderly person and a user who is not familiar with the image forming apparatus.

The user is allowed to arbitrarily switch between the normal mode and the expansion mode to display a screen suitable for his/her eyesight in the image forming apparatus 1L.

In contrast to the image forming apparatus 1L, since the image forming apparatus 1S has only one mode, the user cannot switch between the modes therein.

As described earlier, both the image forming apparatus 1L and the image forming apparatus 1S are configured to allow remote access from another device (terminal 2, for example). When being remotely accessed by such another device, both the image forming apparatus 1L, and the image forming apparatus 1S determine a mode, as described later, depending on the size of a display unit of that another device. Hereinafter, a device which makes a remote access is referred to as a "remote accessing device".

For each of the normal mode and the expansion mode, the screen data storage portion 101 stores in advance screen data 5 for displaying purpose-specific screens 6 (copying, scanning, facsimile transmission, and so on).

For example, there are prepared, as the screen 6 for copying, the copy screen 61T for normal mode as shown in FIG. 4, and the copy screen 61K for expansion mode as shown in FIG. 5. The screen data storage portion 101 stores, therein, screen data 51T as the screen data 5 for displaying the copy screen 61T. The screen data storage portion 101 stores, therein, screen data 51K as the screen data 5 for displaying the copy screen 61K.

Referring to FIGS. 4 and 5, the reference sign "Wa" represents the dimension along the width of the copy screen 61T or the copy screen 61K which is displayed in the touch-sensitive panel display be of the image forming apparatus 1L. The reference sign "Ha" represents the dimension along the height of the copy screen 61T or the copy screen 61K which is displayed in the touch-sensitive panel display 10e of the image forming apparatus 1L.

Both the copy screen 61T and the copy screen 61K are so designed as to be displayed appropriately in the touch-sensitive panel display 10e of the image forming apparatus 1L. The number of pixels along the width of the copy screen 61T is equal to that along the width of the copy screen 61K. The number of pixels along the height of the copy screen 61T is equal to that along the height of the copy screen 61K.

In some cases, a plurality of screens 6 is prepared for one purpose. In such cases, the screen data storage portion 101 stores therein one set of screen data 5 for each of the screens 6. In other cases, the number of screens 6 prepared for one purpose is greater in the expansion mode than in the normal mode. As is clear from the comparison between FIGS. 4 and 5, the number of objects is smaller in the screen 6 for expansion mode than in the screen 6 for normal mode.

The output destination attribute data obtaining portion 102 obtains attribute data 7A indicating attributes of a device for displaying a screen in the following manner. The attribute data 7A indicates attributes of, in particular, the size and display resolution of a display surface (panel).

When no remote accessing devices access the image forming apparatus 1, the output destination attribute data obtaining portion 102 obtains, as the attribute data 7A, data indicating the size of the display surface of the touch-sensitive panel display 10e of the subject image forming apparatus 1. The output destination attribute data obtaining portion 102 may obtain such data by, for example, making an inquiry to the operating system of the subject image forming apparatus 1.

When a remote accessing device accesses the image forming apparatus 1 remotely, the output destination attribute data obtaining portion 102 obtains, as the attribute data 7A, data indicating the size and display resolution of the display surface of the display unit of the remote accessing device. The output destination attribute data obtaining portion 102 may obtain such data by, for example, making an inquiry to the remote accessing device. At the start of the remote access, a user agent sent from the remote accessing device sometimes indicates the size and resolution of the display surface of the display unit. In such a case, the output destination attribute data obtaining portion 102 preferably extracts the attribute data 7A from the user agent.

When the output destination attribute data obtaining portion 102 obtains the attribute data 7A, the display mode determination portion 103 determines a mode based on the size indicated in the attribute data 7A in the following manner.

If the size indicated in the attribute data 7A is equal to or greater than the reference size S0, then the display mode determination portion 103 determines the mode to be the normal mode. In contrast, if the size indicated in the attribute data 7A is smaller than the reference size S0, then the display mode determination portion 103 determines the mode to be the expansion mode.

To be specific, if the reference size S0 is 7.0 inches and the size indicated in the attribute data 7A is 4.3 inches, then the display mode determination portion 103 determines the mode to be the expansion mode. If the reference size S0 is 7.0 inches and the size indicated in the attribute data 7A is 9.0 inches, then the display mode determination portion 103 determines the mode to be the normal mode.

The display screen determination portion 104 determines a screen 6 to be displayed in the touch-sensitive panel display be of the subject image forming apparatus 1 or in the display unit of the remote accessing device in the following manner. Hereinafter, such a screen 6 to be displayed is referred to as a "display target screen".

When the display mode determination portion 103 determines the mode to be the normal mode, the display screen determination portion 104 checks a screen 6 for normal mode corresponding to an input from an external device or to the result of processing by the subject image forming apparatus 1 by a method similar to conventional methods. The display mode determination portion 103 then determines that the screen 6 for normal mode is the display target screen. In such a case, for example, when a function key for copying is pressed in the operating key panel 10f, the display mode determination portion 103 determines that the copy screen 61T (see FIG. 4) is the display target screen.

Alternatively, when the display mode determination portion 103 determines the mode to be the expansion mode, the display screen determination portion 104 checks a screen 6 for expansion mode corresponding to an input from an external device or to the result of processing by the subject image forming apparatus 1 by a method similar to conventional methods. The display mode determination portion 103 then determines that the screen 6 for expansion mode is the display target screen. In such a case, for example, when the function key for copying is pressed in the operating key panel 10f, the display mode determination portion 103 determines that the copy screen 61K (see FIG. 5) is the display target screen.

If the screen 6 (display target screen) determined by the display mode determination portion 103 is one for expansion mode, then the object adding portion 105 adds a NEXT button 6*b* to the screen 6 at a predetermined position at which no other objects are provided. To be specific, screen data 5 for the screen 6 is read out from the screen data storage portion 101, and a code for the NEXT button 6*b* is added to the screen data 5. The NEXT button 6*b* is to invoke a screen 6 for normal mode corresponding to the display target screen 6.

The draw processing portion 106 generates, based on the screen data 5 for the screen 6 (display target screen) determined by the display screen determination portion 104, bitmap data 5 BM, for the screen 6, which is enlarged or reduced in accordance with the display resolution of the output destination. In short, the draw processing portion 106 performs so-called draw processing. Suppose that the original number of pixels of the screen 6 is 1600×900 dots, and that the display resolution of the output destination is 800×450 dots. In such a case, the draw processing portion 106 generates bitmap data 5 BM having a size corresponding to one fourth of the screen 6.

However, if the object adding portion 105 adds the code for the NEXT button 6*b* to the screen data 5, then the draw processing portion 106 generates the bitmap data 5 BM based on the post-addition screen data 5.

The draw processing portion 106 sends the bitmap data 5 BM generated to the output destination. The screen 6 is then displayed at the output destination. If no remote accessing devices access the image forming apparatus 1, then the bitmap data 5 BM is sent to the touch-sensitive panel display 10*e* of the subject image forming apparatus 1, so that the screen 6 is displayed in the touch-sensitive panel display 10*e* thereof. In contrast, if a remote accessing device accesses the image forming apparatus 1 remotely, then the bitmap data 5 BM is sent to the remote accessing device, so that the screen 6 is displayed in a display unit of the remote accessing device.

For example, in the image forming apparatus 1S, in the case where the touch-sensitive panel display 10*e* of the image forming apparatus 1S is the output destination, and where a screen 6 to be displayed is the copy screen 61K (see FIG. 5), the copy screen 61K is reduced to fit the touch-sensitive panel display 10*e* so that the copy screen 61K is displayed in the touch-sensitive panel display 10*e* as shown in FIG. 6. Further, the NEXT button 6*b* is added to the copy screen 61K. Referring to FIG. 5, Wb<Wa and Hb<Ha.

While remotely accessing the image forming apparatus 1, the terminal 2 controls the image forming apparatus 1 by a known method. For example, the terminal 2 sends, to the image forming apparatus 1, data on details of operation on the touch-sensitive panel display 20*d* of the subject terminal 2. The details of operation include coordinates of a touched position and the type of a gesture. The image forming apparatus 1 performs processing based on the data.

[Invoking Normal Mode from Screen for Expansion Mode]

Figure 7:
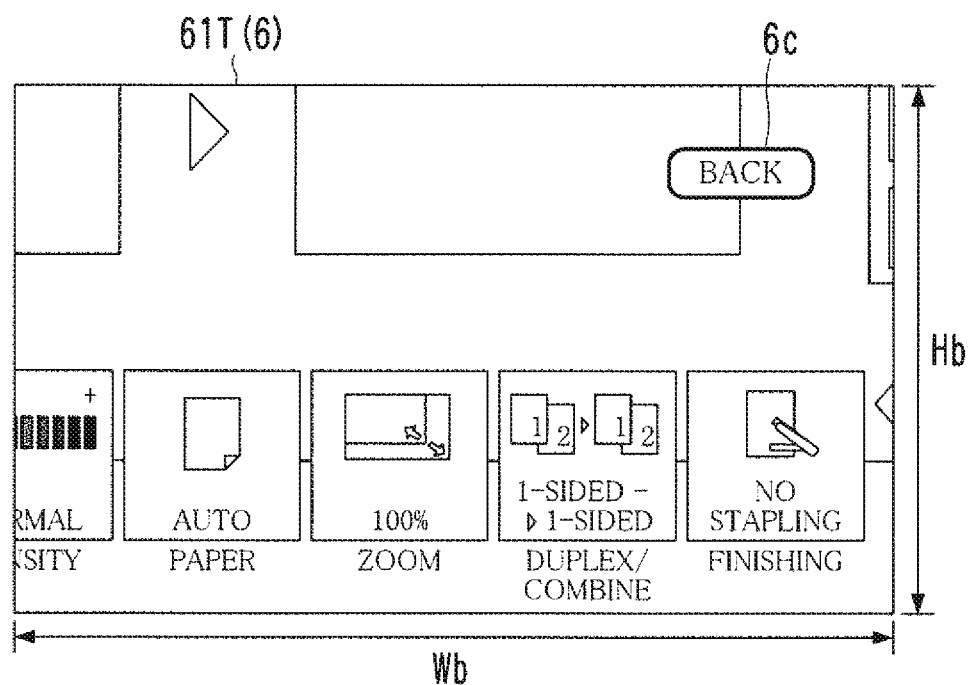
FIG. 7 is a diagram showing an example as to how a copy screen is displayed in an output destination having a size smaller than a reference size.
Figure 8:
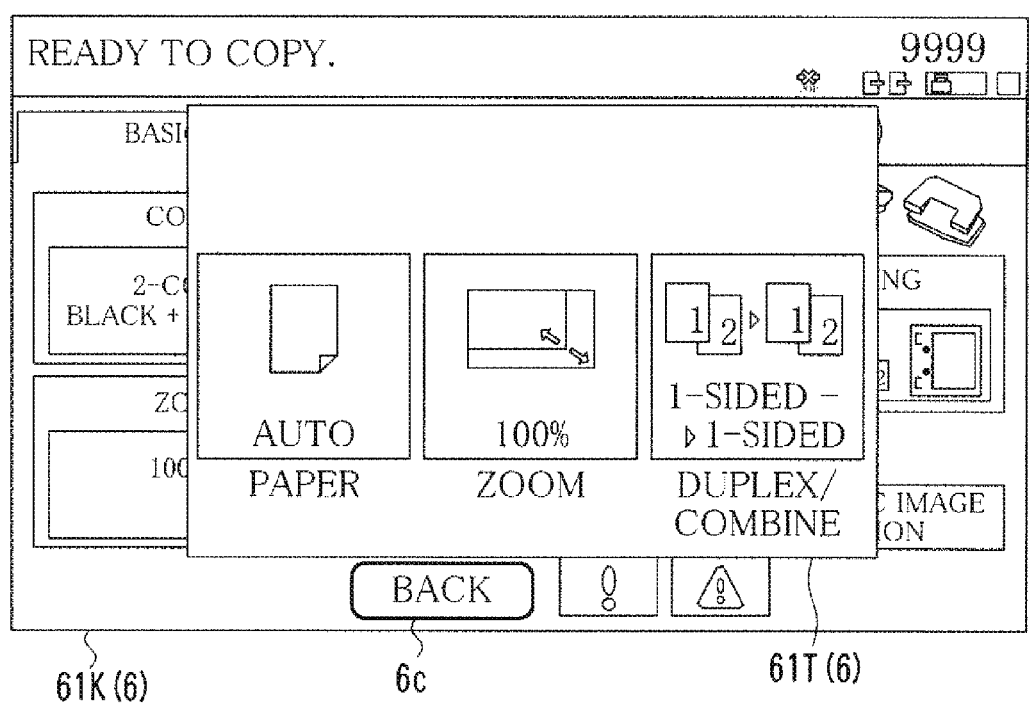
FIG. 8 is a diagram showing a modified example as to how a copy screen is displayed in an output destination having a size smaller than a reference size.
Figure 9:
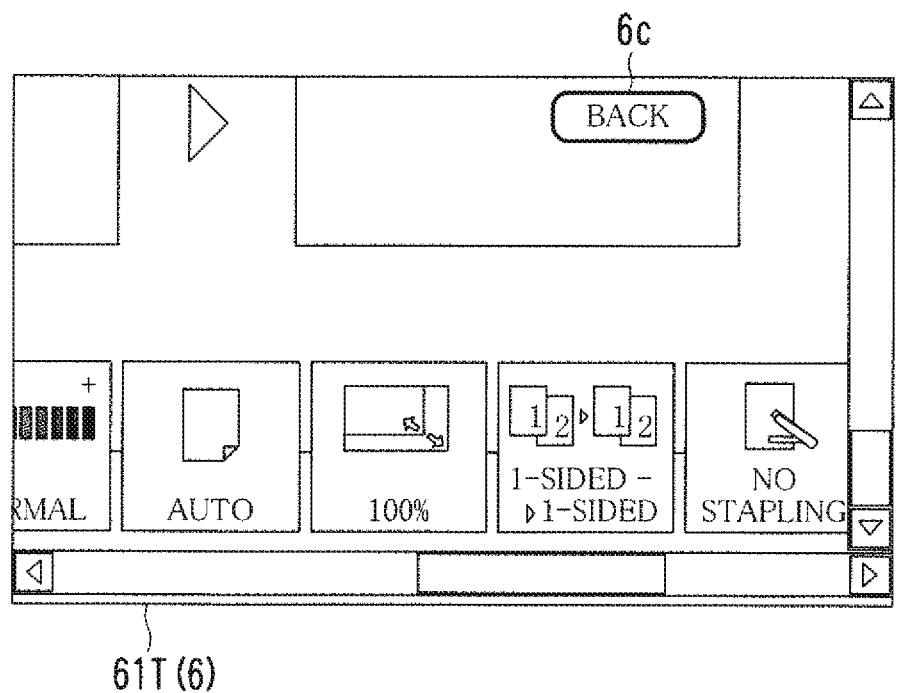
FIG. 9 is a diagram showing a modified example as to how a copy screen is displayed in an output destination having a size smaller than a reference size.

FIG. 7 is a diagram showing an example as to how the copy screen 61T is displayed in an output destination having a size smaller than the reference size S0. FIGS. 8 and 9 are diagrams showing modified examples as to how the copy screen 61T is displayed in the output destination having a size smaller than the reference size S0.

According to the foregoing processing, the screen 6 for expansion mode (for example, the copy screen 61K in FIG. 5) is displayed in the image forming apparatus 1S; however, the screen 6 for normal mode (for example, the copy screen 61T in FIG. 4) is not displayed therein. Nevertheless, the user sometimes intends to use the screen 6 for normal mode to operate the image forming apparatus 1S because more objects are provided in the screen 6 for normal mode than in the screen 6 for expansion mode.

In such a case, the user preferably taps on the NEXT button 6*b* disposed in the screen 6 for selection. In response to the user operation, the individual portions of the image forming apparatus 1S shown in FIG. 3 perform the processing in the following manner.

The display screen determination portion 104 determines a screen 6 for normal mode corresponding to the screen 6 to be the display target screen. For example, if the user taps on the NEXT button 6*b* of the copy screen 61K, then the display screen determination portion 104 determines the copy screen 61T to be the display target screen.

When the display target screen is determined in connection with the NEXT button 6*b* tapped on, the object adding portion 105 adds a BACK button 6*c* to the display target screen (copy screen 61T, for example) at a predetermined position at which no other objects are disposed. The method for adding the BACK button 6*c* is the same as that for adding the NEXT button 6*b*. To be specific, the object adding portion 105 invokes the screen data 5 for the display target screen from the screen data storage portion 101 to add a code for the BACK button 6*c* to the screen data 5 thus invoked.

When the display target screen is determined in connection with the NEXT button 6*b* tapped on, the draw processing portion 106 generates bitmap data 5 BM on the screen 6 to which the BACK button 6*c* is added. In short, the draw processing portion 106 performs so-called draw processing.

At this time, however, the screen 6 is not reduced. In the case where the display resolution of the output destination is lower than the original number of pixels of the screen 6, the screen 6 is not displayed at one time. To cope with this, a region of a predetermined part of the screen 6 is trimmed out and only bitmap data for the region is sent to the output destination. The number of pixels of the region is the same as the display resolution of the output destination.

In this way, in the touch-sensitive panel display 10*e* of the image forming apparatus 1S, for example, only a part of the copy screen 61T is displayed as shown in FIG. 7. At this time, the screen 6 for expansion mode (copy screen 61K, for example) previously displayed is not visible due to the part of the copy screen 61T, The user performs a touch gesture such as flicking or swiping on the touch-sensitive panel display 10*e*.

In response to such a touch gesture, the draw processing portion 106 obtains the direction and distance of the movement corresponding to the gesture by using a known method. The draw processing portion 106 then sends, to the output destination, bitmap data on a region corresponding to the direction and distance of the movement. This leads the screen 6 to be scrolled.

When the BACK button 6*c* is tapped on, the draw processing portion 106 finishes the processing for drawing the screen 6 for normal mode (copy screen 61T, for example), and performs processing for displaying the screen 6 for expansion mode (copy screen 61K, for example) again.

Alternatively, as shown in FIG. 8, a part of the screen 6 for normal mode may be displayed above the screen 6 for expansion mode.

Yet alternatively, as shown in FIG. 9, an object such as a scroll bar for scrolling through the screen 6 for normal mode may be provided.

[Output Destination Switching]

Figure 10:
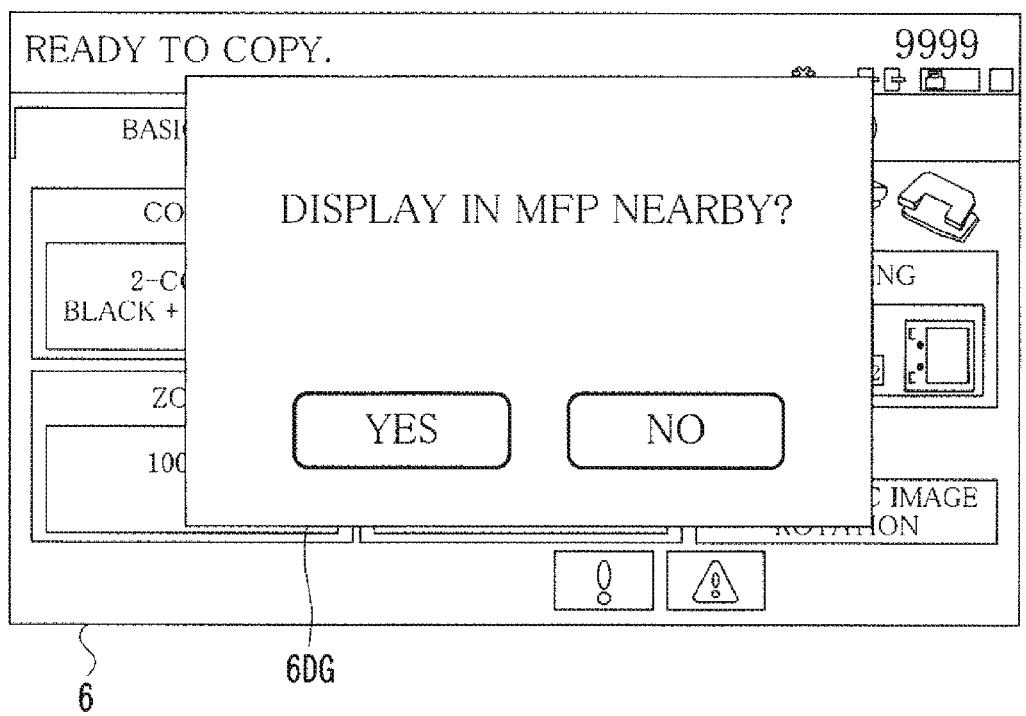
FIG. 10 is a diagram showing an example of a dialog window.
Figure 11:
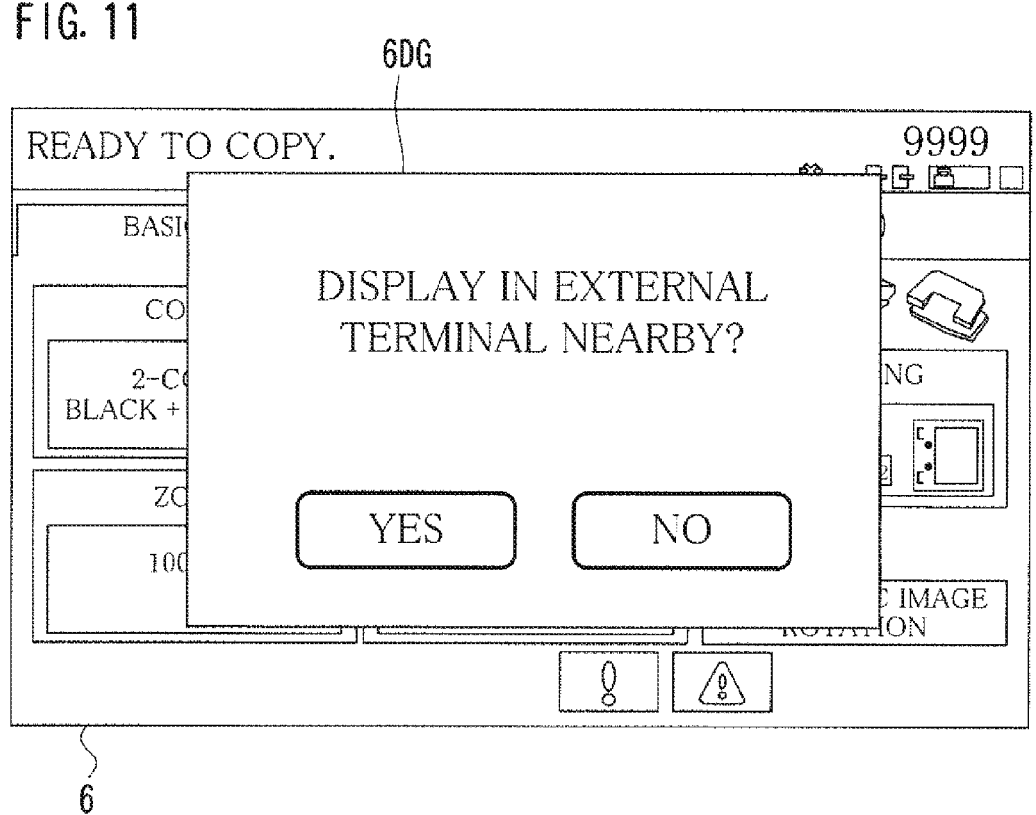
FIG. 11 is a diagram showing an example of a dialog window.

FIGS. 10 and 11 are diagrams showing examples of a dialog window 6DG.

According to the foregoing processing, the screen 6 for expansion mode is displayed in the touch-sensitive panel display 10e of the image forming apparatus 1S (see FIG. 6). Alternatively, according to the foregoing processing, the screen 6 for normal mode is displayed part by part without being reduced (see FIG. 7). The entirety of the screen 6 for normal mode is not displayed at one time.

However, the user is capable of letting the entirety of the screen 6 for normal mode be displayed by causing a device with a display unit having a size equal to or greater than the reference size S0 to remotely access the image forming apparatus 1S.

For facilitating the remote access, the individual portions of the image forming apparatus 1 shown in FIG. 3 perform processing as follows.

The adjacent device detection portion 107 detects devices each of which is positioned adjacent to the subject image forming apparatus 1 and has the remote access capability. Such a device is hereinafter referred to as an "adjacent device". The detection may be performed by a known method.

For example, the adjacent device detection portion 107 causes the short-range wireless communication device 10h to search for devices positioned within a service area of the short-range wireless communication device 10h. The adjacent device detection portion 107 makes an inquiry to each of the devices found out as to whether or not to have the remote access capability. The adjacent device detection portion 107 then detects, as the adjacent device, such a device that has the remote access capability. Alternatively, instead of making such an inquiry, the adjacent device detection portion 107 may detect, among the devices found out by the search, a device registered in the image forming apparatus 1 in advance as the adjacent device.

Detecting the adjacent devices may be made at regular intervals (every minute, for example), or, may be made when the user enters a predetermined command.

When the adjacent device detection portion 107 detects an adjacent device, the remote access request portion 108 instructs the adjacent device to access the subject image forming apparatus 1 remotely. Alternatively, in response to a permission given by the user, the remote access request portion 108 may instruct the adjacent device to access the subject image forming apparatus 1 remotely.

To be specific, if the image forming apparatus 1L is detected as the adjacent device, then the remote access request portion 108 displays the dialog window 6DG as shown in FIG. 10 above the current screen 6 appearing in the touch-sensitive panel display 10e. In response to "YES" tapped by the user, the remote access request portion 108 instructs the image forming apparatus 1L to access the subject image forming apparatus 1 remotely. Alternatively, if the terminal 2L is detected as the adjacent device, then the remote access request portion 108 displays the dialog window 6DG as shown in FIG. 11 above the current screen 6 appearing in the touch-sensitive panel display 10e. In response to "YES" tapped by the user, the remote access request portion 108 instructs the terminal 2L to access the subject image forming apparatus 1 remotely.

When being instructed by the remote access request portion 108, the adjacent device remotely accesses the requesting image forming apparatus 1 by using a known method. This changes the output destination of the screen 6 to a display unit of the adjacent device. In response to the change, the following processing is performed in the image forming apparatus 1.

The output destination attribute data obtaining portion 102 obtains the attribute data 7A from the adjacent device. The method for obtaining is the same as discussed above.

The display mode determination portion 103 determines a mode based on the attribute data 7A obtained. The method for determining is the same as discussed above.

The display screen determination portion 104 determines a display target screen. Herein, the display target screen is determined as follows.

If the display mode determination portion 103 determines the mode to be the normal mode, then the display screen determination portion 104 uses a method similar to a conventional method to determine a screen 6 for normal mode corresponding to the screen 6 which has appeared in the touch-sensitive panel display 10e of the subject image forming apparatus 1 until immediately before the remote access. The display screen determination portion 104 determines the screen 6 to be the display target screen.

On the other hand, if the display mode determination portion 103 determines the mode to be the expansion mode, then the display screen determination portion 104 determines the screen 6 which has appeared in the touch-sensitive panel display be of the subject image forming apparatus 1 until immediately before the remote access to be the display target screen.

The draw processing portion 106 generates, as discussed above, the bitmap data 5BM for the display target screen which has been enlarged or reduced appropriately depending on the display resolution of a display unit of the output destination (adjacent device). The bitmap data 5 BM generated is sent to the adjacent device, and then the screen 6 is displayed in the display unit of the adjacent device.

As a result of the foregoing processing, for example, in the case where the screen 6 which has appeared until immediately before the remote access is the copy screen 61K (see FIG. 5) and where the adjacent device is the image forming apparatus 1L, the copy screen 61T (see FIG. 4) is displayed in the touch-sensitive panel display 10e of the image forming apparatus 1L. This is because the size of the touch-sensitive panel display 10e of the image forming apparatus 1L is equal to or greater than the reference size S0. In the case where the adjacent device is the terminal 2L, the copy screen 61T is displayed in the touch-sensitive panel display 20d of the terminal 2L. This is because the size of the touch-sensitive panel display 20d of the terminal 2L is equal to or greater than the reference size S0. However, in the case where the adjacent device is the terminal 2S, the copy screen 61K is displayed in the touch-sensitive panel display 20d of the terminal 2S. This is because the size of the touch-sensitive panel display 20d of the terminal 2S is smaller than the reference size S0.

If a plurality of devices is detected as the adjacent devices, then the user may select one of the devices as the remote accessing device. Then, the remote access request portion 108 preferably requests the selected adjacent device to access the image forming apparatus 1 remotely.

[Manual Switching between Modes]

As discussed above, the image forming apparatus 1 determines a mode in accordance with the size of a display surface of the output destination of the screen 6. Instead of this, however, the user may determine any one of the modes. The processing for such a case is described below by taking an example of the image forming apparatus 1L.

As noted above, the image forming apparatus 1L has two modes of the normal mode and the expansion mode.

The user performs predetermined operation (for example, pressing a predetermined function key of the operating key panel 10f) to select the normal mode or the expansion mode.

The display mode data storage portion 122 stores, therein, mode data 7B indicating the current mode. The default value of the mode data 7B is set at "NULL".

In response to the normal mode selected by the user, the display mode switching portion 121 changes the value of the mode data 7B to "normal mode". Alternatively, in response to the expansion mode selected by the user, the display mode switching portion 121 changes the value of the mode data 7B to "expansion mode".

As discussed earlier, the display mode determination portion 103 determines a mode based on the attribute data 7A of an output destination. However, if the mode data 7B indicates a value other than the value of "NULL", then the display mode determination portion 103 follows the value indicated in the mode data 7B. In other words, the display mode determination portion 103 determines a mode independently of the attribute data 7A. When the mode data 7B indicates the "normal mode", the display mode determination portion 103 determines the mode to be the normal mode. When the mode data 7B indicates the "expansion mode", the display mode determination portion 103 determines the mode to be the expansion mode. In contrast, when the mode data 7B indicates the value of "NULL", the display mode determination portion 103 determines a mode based on the attribute data 7A of an output destination.

It is possible to, in the image forming apparatus 1S, disable the functions of the display mode switching portion 121 and to fix the value of the mode data 7B at the value of "NULL". In short, manual switching between the modes may be prohibited in the image forming apparatus 1S.

Figure 12:
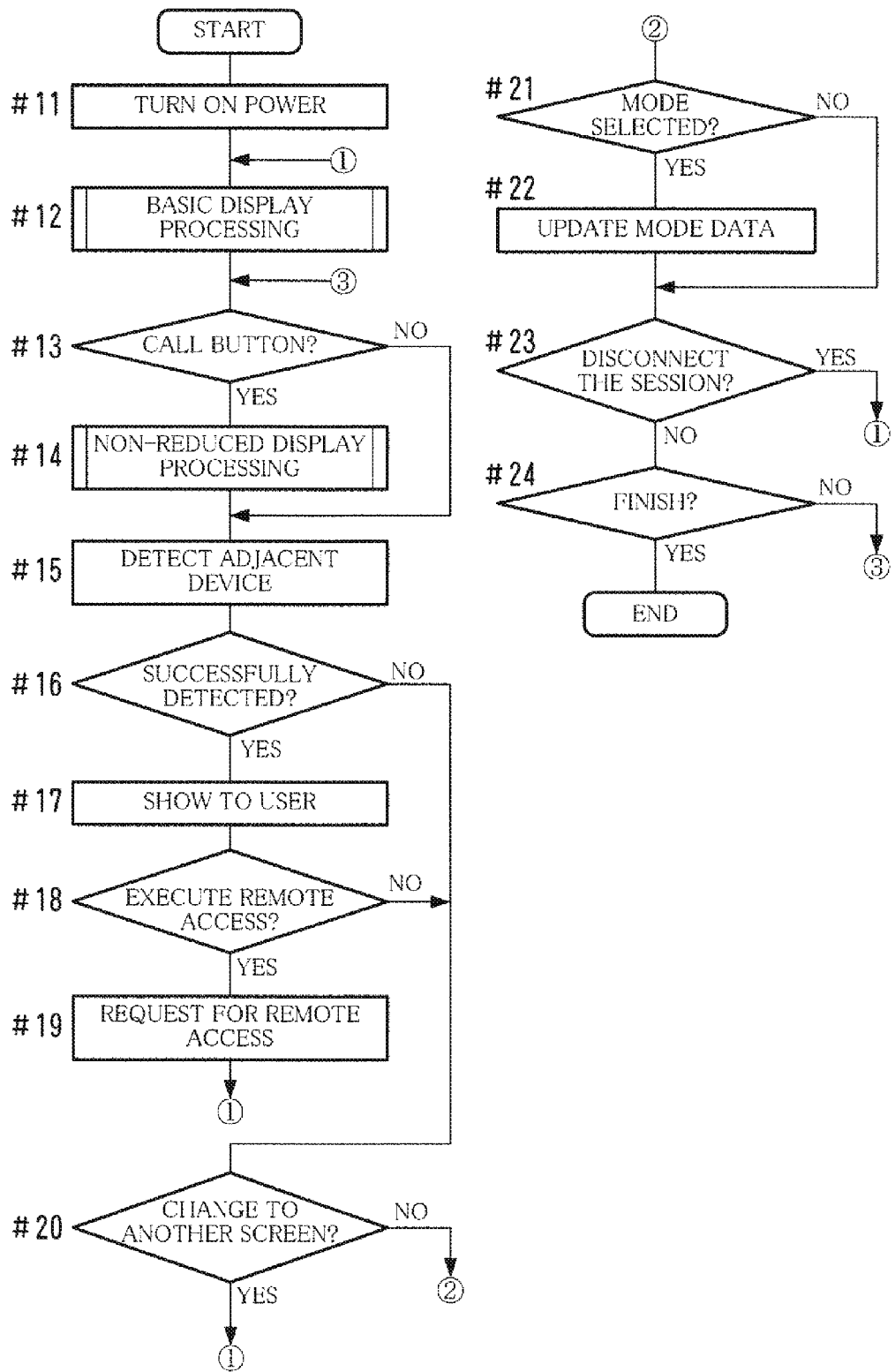
FIG. 12 is a flowchart depicting an example of the flow of the entire processing based on a screen display program.
Figure 13:
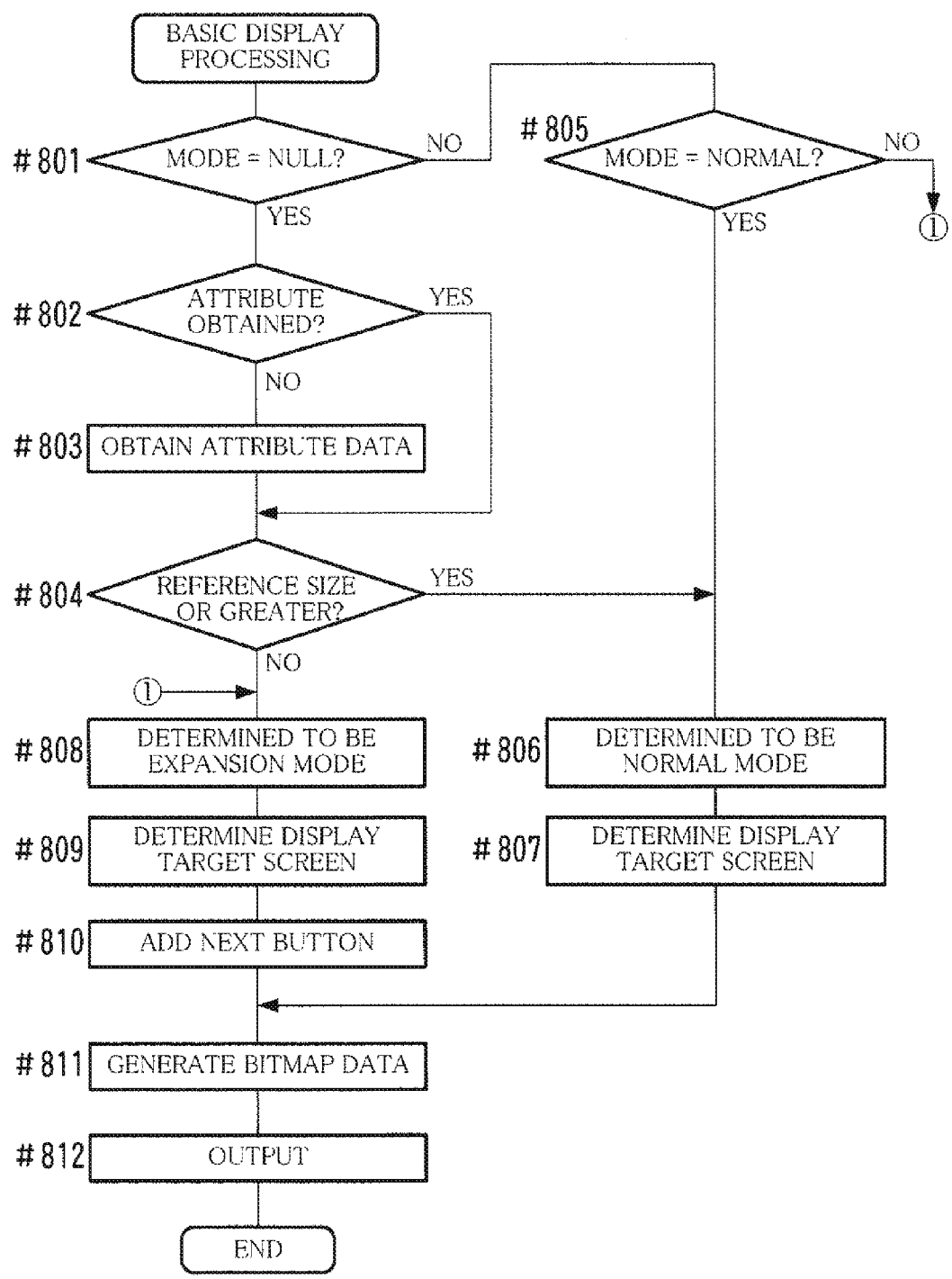
FIG. 13 is a flowchart depicting an example of the flow of basic display processing.
Figure 14:
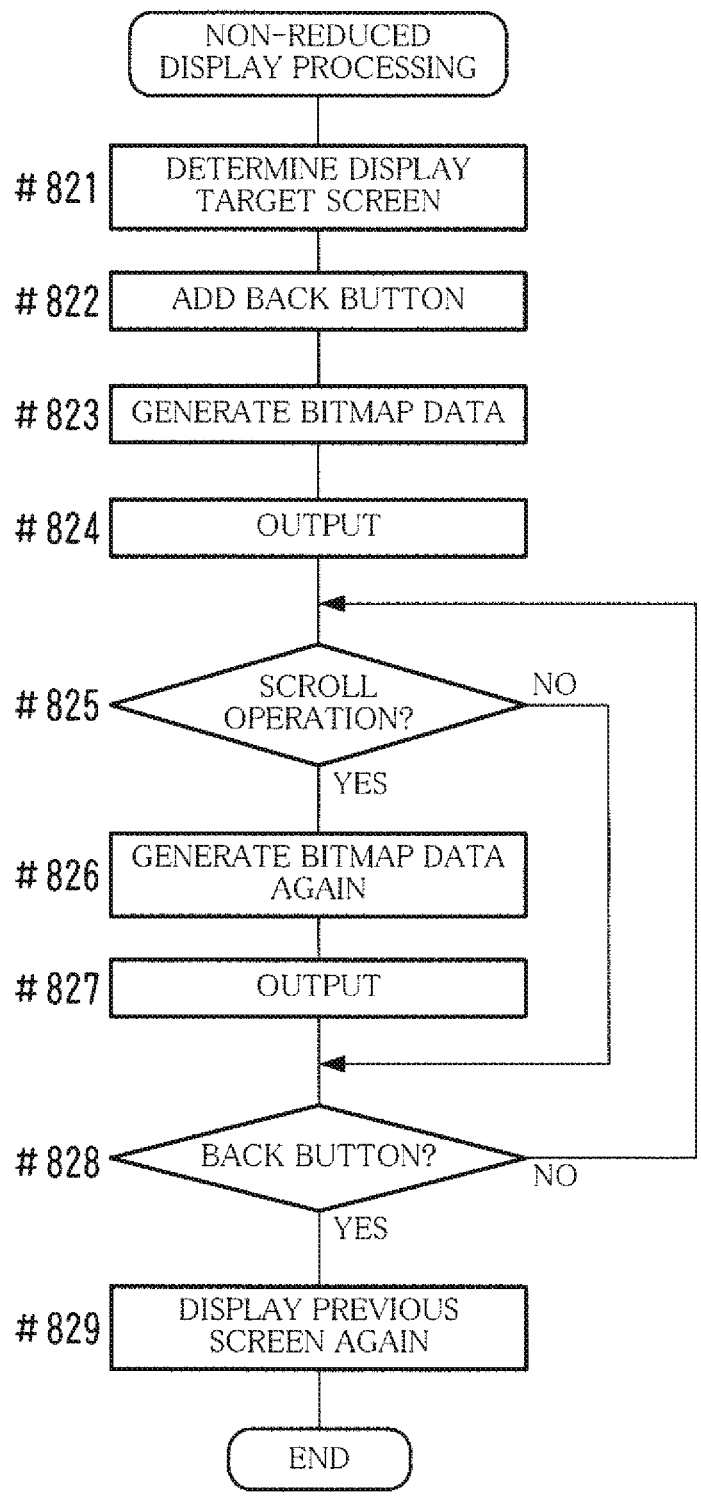
FIG. 14 is a flowchart depicting an example of the flow of non-reduced display processing.

FIG. 12 is a flowchart depicting an example of the flow of the entire processing based on the screen display program 10P. FIG. 13 is a flowchart depicting an example of the flow of basic display processing. FIG. 14 is a flowchart depicting an example of the flow of non-reduced display processing.

The description goes on to the flow of the entire processing by the image forming apparatus 1 with reference to the flowcharts.

Referring to FIG. 12, when the power source is turned ON, the image forming apparatus 1 launches the operating system and the screen display program 10P (Step #11). The image forming apparatus 1 performs processing based on the screen display program 10P as follows.

The image forming apparatus 1 displays the screen 6 (Step #12). The screen 6 is displayed by a method depicted in FIG. 13.

If the mode data 7B indicates the value of "NULL" (YES in Step #801 of FIG. 13), then the image forming apparatus 1 obtains the attribute data 7A of the current output destination (Step #803). If the attribute data 7A has already been obtained (YES in Step #802), then the processing of Step #803 may be bypassed.

If the attribute data 7A indicates a size equal to or greater than the reference size S0 (YES in Step #804), then the image forming apparatus 1 determines the mode to be the normal mode (Step #806). In contrast, if the attribute data 7A indicates a size smaller than the reference size S0 (NO in Step #804), then the image forming apparatus 1 determines the mode to be the expansion mode (Step #808).

Alternatively, if the mode data 7B indicates the value of "normal mode" (NO in Step #801, and YES in Step #805), then the image forming apparatus 1 determines the mode to be the normal mode (Step #806). In contrast, if the mode data 7B indicates the value of "expansion mode" (NO in Step #801, and NO in Step #805), then the image forming apparatus 1 determines the mode to be the expansion mode (Step #808).

When determining the mode to be the normal mode (Step #806), the image forming apparatus 1 checks a screen 6 for normal mode which corresponds to an input from an external device or the result of processing by the subject image forming apparatus 1, and determines that the screen 6 is the display target screen (Step #807).

On the other hand, when determining the mode to be the expansion mode (Step #808), the image forming apparatus 1 checks a screen 6 for expansion mode which corresponds to an input from an external device or the result of processing by the subject image forming apparatus 1, determines that the screen 6 is the display target screen (Step #809), and adds the NEXT button 6b to the display target screen (Step #810).

The image forming apparatus 1 then generates bitmap data 5BM (Step #811) for the display target screen determined in Step #807 or #809, and outputs the bitmap data 5 BM to the output destination (Step #812).

As described above, once the image forming apparatus 1 determines the mode to be the expansion mode, the NEXT button 6b is added to the display target screen even if the output destination is the touch-sensitive panel display 10e of the subject image forming apparatus 1 or is another device which remotely accesses the image forming apparatus 1. Therefore, even when the image forming apparatus 1 is not provided with a touch-sensitive panel display and is accessed remotely by another device, the user is allowed to change the mode from the expansion mode to the normal mode.

Referring back to FIG. 12, if the NEXT button 6b is tapped on the screen 6 (YES in Step #13), then the image forming apparatus 1 displays the screen 6 for normal mode corresponding to the tapped screen 6 (Step #14). The display processing is performed in accordance with the method depicted in FIG. 14.

The image forming apparatus 1 checks the screen 6 for normal mode corresponding to the screen currently appearing in the touch-sensitive panel display 10e of the subject image forming apparatus 1, and determines that the screen 6 for normal mode thus checked is the display target screen (Step #821).

The image forming apparatus 1 then adds the BACK button 6c to the display target screen (Step #822), and generates the bitmap data 5 BM (Step #823). The image forming apparatus 1 then displays the display target screen as illustrated in FIG. 7 (Step #824).

If the user performs predetermined operation (YES in Step #825), then the image forming apparatus 1 scrolls through the display target screen depending on the operation. To be specific, the image forming apparatus 1 generates (Step #826) bitmap data on a region to be displayed of the display target screen depending on the operation, and displays the region (Step #827).

If the user taps on the BACK button 6c (YES in Step #828), then the image forming apparatus 1 finishes displaying the display target screen, and displays again the screen 6 which has been displayed prior to the display target screen (Step #829).

Referring back to FIG. 12, the image forming apparatus 1 attempts to detect an adjacent device (Step #15) in response to a command from the user, or, at predetermine time intervals.

If detecting an adjacent device successfully (YES in Step #16), then the image forming apparatus 1 asks the user as to whether or not the adjacent device is to be used instead of the touch-sensitive panel display 10e (Step #17). At this time, the image forming apparatus 1 displays the dialog window 6DG such as that shown in FIG. 10 or FIG. 11.

If the user enters a command to use the adjacent device (YES in Step #18), then the image forming apparatus 1 requests the adjacent device to remotely access the image forming apparatus 1 (Step #19). In response to the request, when the adjacent device accesses the image forming apparatus 1 remotely, the image forming apparatus 1 performs processing for enabling the adjacent device to display the screen 6 (Step #12). The steps for the processing are the same as those discussed above with reference to FIG. 13.

When the image forming apparatus 1 is accessed remotely, the processing of Steps #15 through #19 may be bypassed.

If the user performs operation for changing the current screen 6 to another screen 6, or, alternatively, if a need to display another screen 6 arises depending on the result of processing (YES in Step #20), then the image forming apparatus 1 performs processing for displaying that another screen 6 instead of the current screen 6 (Step #12). The steps for displaying that another screen 6 are the same as discussed above with reference to FIG. 13.

If the user selects the normal mode or the expansion mode (YES in Step #21), then the image forming apparatus 1 updates the mode data 7B to indicate the selected mode (Step #22).

If the remote access is disconnected (YES in Step #23), then the image forming apparatus 1 displays the screen 6 for normal mode or the screen 6 for expansion mode each of which corresponds to the screen 6 displayed in the adjacent device (Step #12). The steps for displaying the screen 6 for normal mode or the screen 6 for expansion mode are the same as discussed above with reference to FIG. 13.

The image forming apparatus 1 performs the processing of Steps #12 through #23 appropriately until the screen display program 10p is finished.

According to the embodiment, it is possible to use, in the image forming apparatus 1 with a small display surface (the image forming apparatus 15, for example), the screen 6 for normal mode and the screen 6 for expansion mode of the image forming apparatus 1 having the touch-sensitive panel display 10e with a large display surface (the image forming apparatus 1L, for example).

In particular, the screen 6 for expansion mode can be used appropriately in the image forming apparatus 1 with a small display surface. If the screen 6 for normal mode is reduced so as to fit the image forming apparatus 1 with a small display surface, objects are also reduced excessively, which degrades the visibility and the operational flexibility. However, the screen 6 for expansion mode is so designed to have fewer objects than those for normal mode and have larger objects than those for normal mode in order to support the accessibility. Therefore, even when the screen 6 for expansion mode is reduced so as to fit the image forming apparatus 1 with a small display surface, objects are not downsized more than necessary. As compared with the case of reducing the screen 6 for normal mode, the visibility and the operational flexibility are less likely to be degraded in the case of reducing the screen 6 for expansion mode.

Thus, it is possible for a manufacturer of image forming apparatuses with display units having different-sized display surfaces to reduce the number of man-hours for developing a screen as compared with conventional technologies.

Figure 15:
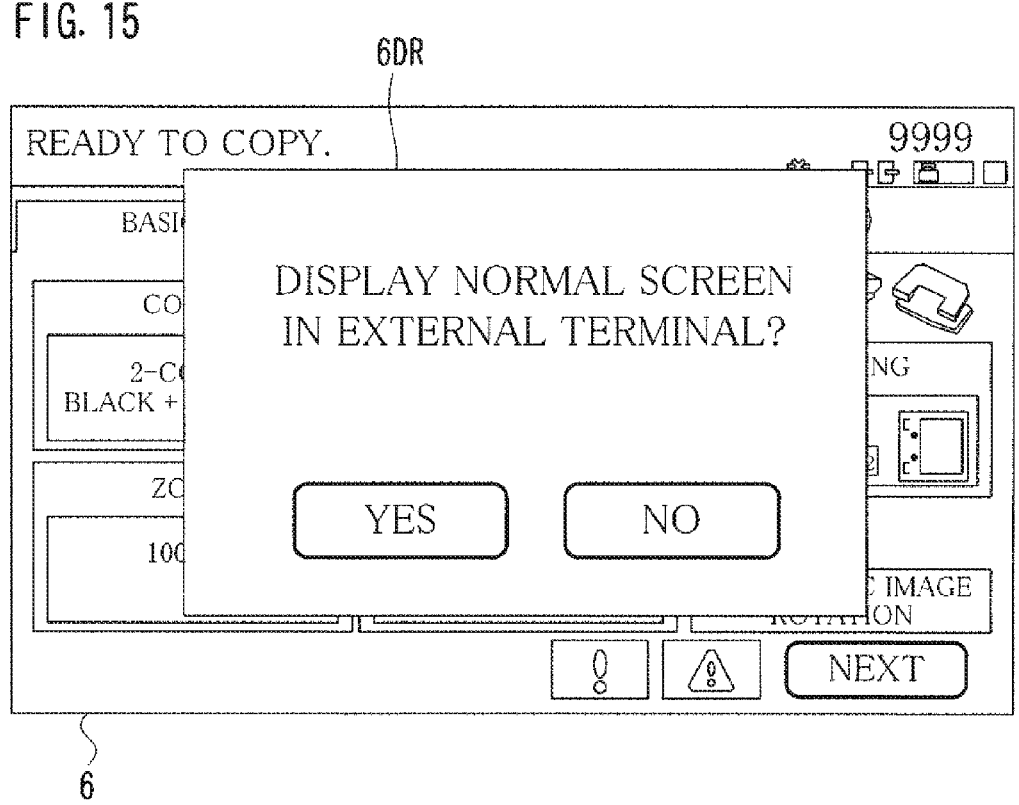
FIG. 15 is a diagram showing an example of a dialog window.
Figure 16:
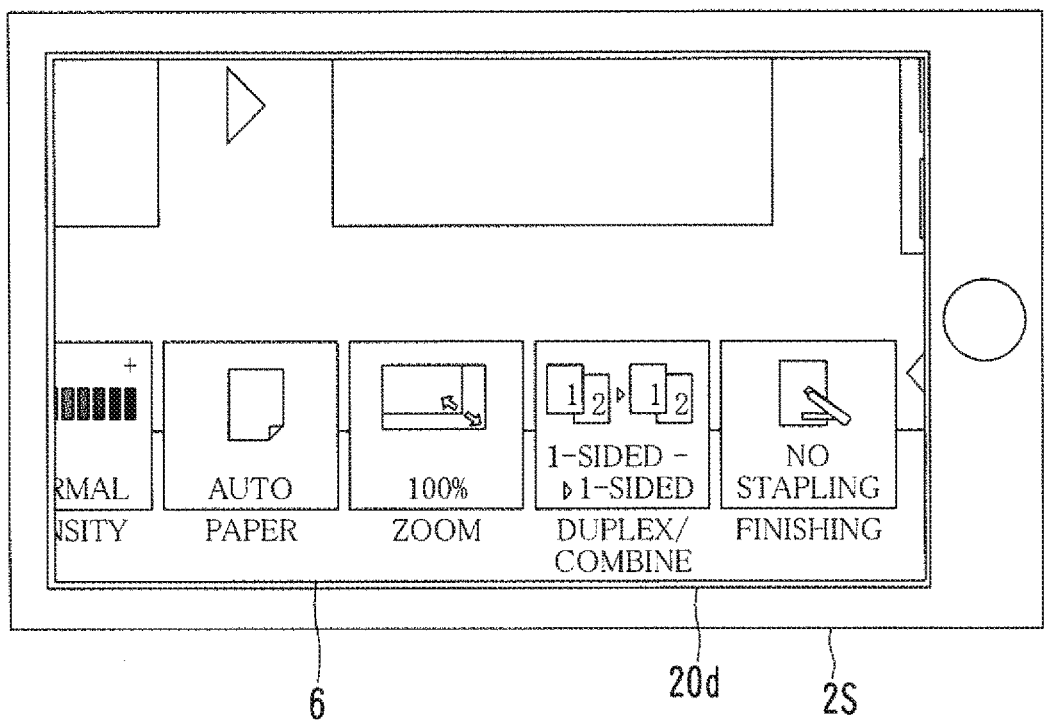
FIG. 16 is a diagram showing an example as to how a screen for normal mode is displayed in a terminal.

FIG. 15 is a diagram showing an example of a dialog window 6DR. FIG. 16 is a diagram showing an example as to how the screen 6 for normal mode is displayed in the terminal 2S.

In this embodiment, in the case where the terminal 2S accesses the image forming apparatus 1 remotely, the screen 6 for expansion mode is reduced and the resultant is displayed in the touch-sensitive panel display 20d of the terminal 2S (see FIG. 6). This is because the size of the touch-sensitive panel display 20d of the terminal 2S is smaller than the reference size S0.

Instead of this, however, the screen 6 for normal mode corresponding to the screen 6 for expansion mode may be displayed as with the case where the screen 6 is displayed in the touch-sensitive panel display 10e of the image forming apparatus 1S. In such a case, the image forming apparatus 1 preferably performs processing as follows.

When it is informed that the size of the touch-sensitive panel display 20d of the terminal 2S is smaller than the reference size S0, the display screen determination portion 104 of FIG. 3 displays the dialog window 6DR such as that shown in FIG. 15 in the touch-sensitive panel display 10e of the subject image forming apparatus 1 before the remote access request portion 108 makes a request to the terminal 2S.

When the user touches "YES" in the dialog window 6DR, the display screen determination portion 104 displays the screen 6 for normal mode in the touch-sensitive panel display 20d of the terminal 2S part by part without reducing the screen 6 for normal mode in the manner as described earlier. The method for generating the bitmap data 5 BM is the same as with the case of displaying the screen 6 in the touch-sensitive panel display 10e.

As a result, in the case where the terminal 2S remotely accesses the image forming apparatus 15 with the copy screen 61K displayed in the image forming apparatus 15, the copy screen 61T is displayed in the touch-sensitive panel display 20d of the terminal 2S as shown in FIG. 16.

In this embodiment, the original number of pixels of the screen 6 for normal mode (copy screen 61T, for example) is the same as the original number of pixels of the screen 6 for expansion mode (copy screen 61K, for example). Instead, the former and the latter may be different from each other. In such a case, each of the screens 6 is preferably enlarged or reduced appropriately depending on the size of a display unit of an output destination for display.

It is to be understood that the configurations of the image processing system 4 and the image forming apparatus 1, the constituent elements thereof, the content and order of the processing, the configuration of the screen 6, the configuration of the data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A display control device comprising:
   a first display,
   a storage for storing a first screen data and a second screen data, and
   a hardware processor configured to:
      selectively switch to display on the first display between a first screen based on the first screen data including first objects disposed therein and a second screen based on the second screen data instead of the first screen, the second screen including second objects disposed therein according to user's operation, the second screen corresponding to the first screen so as to have a same purpose as the first screen, and each of the second objects corresponding to any one of the first objects and having a larger size than a corresponding one of the first objects so that the second objects are more accessible to a user in the second screen than the first objects in the first screen, obtain size data indicating a size of a display surface of a second display provided in a remote accessing device, the remote accessing device remotely accessing the display control device, determine whether a size of the second display is larger or smaller than a predetermined size based on the size data, output the first screen data for the first screen to the remote accessing device so as to display the first screen on the second display when the size of the second display is larger than the predetermined size, and output the second screen data for the second screen to the remote accessing device so as to display the second screen on the second display when the size of the second display is smaller than the predetermined size.

2. The display control device according to claim 1, wherein
the first screen is designed to have a normal design, and the second screen is designed to have a design for accessibility.

3. The display control device according to claim 1, wherein the processor reduces, if necessary, the second screen to display an entirety of the second screen across the second display.

4. The display control device according to claim 1, wherein, when the size of the display surface is larger than the predetermined size, the processor displays, on the second display, the second screen instead of the first screen in accordance with a command given by a user.

5. The display control device according to claim 1, wherein,
when the size of the display surface is smaller than the predetermined size, the processor adds a selectable object to the second screen to display the second screen on the second display, and
when the selectable object is selected later, the processor displays, in the display unit, a part of the first screen instead of the second screen, or, alternatively, the part of the first screen above a part of the second screen.

6. The display control device according to claim 5, wherein the processor displays, on the second display, the part of the first screen together with a scroll bar, and scrolls through the first screen in accordance with operation on the scroll bar.

7. The display control device according to claim 1, wherein both the second display and the processor are provided in one image forming apparatus.

8. The display control device according to claim 1, wherein the first objects include at least one of a letter, a button, and a tab, and the second objects include at least one of a letter, a button, and a tab.

9. The display control device according to claim 1, wherein the second objects in the second screen are arranged in a different location than the first objects in the first screen.

10. An image processing apparatus comprising:
the display control device according to claim 1, wherein
the hardware processor is configured to obtain size data indicating a size of a display surface of the first display to display, based on the size data, either one of the first screen and the second screen on the first display.

11. An image processing apparatus comprising:
the display control device according to claim 1.

12. An image processing apparatus comprising;
the display control device according to claim 1, wherein
the hardware processor is configured to obtain size data indicating a size of a display surface of the second display provided in another image processing apparatus to display, based on the size data, either one of the first screen and the second screen on the second display.

13. A method for displaying a screen in a display unit, the method comprising:
selectively switching to displaying on a first display between a first screen based on a first screen data including first objects disposed therein and a second screen based on a second screen data instead of the first screen, the second screen including second objects disposed therein according to user's operation, the second screen corresponding to the first screen so as to have a same purpose as the first screen, and each of the second objects corresponding to any one of the first objects and having a larger size than a corresponding one of the first objects so that the second objects are more accessible to a user in the second screen than the first objects in the first screen, obtaining size data indicating a size of a display surface of a second display provided in a remote accessing device, the remote accessing device remotely accessing the first display, determining whether a size of the second display is larger or smaller than a predetermined size based on the size data, outputting the first screen data for the first screen to the remote accessing device so as to display the first screen on the second display when the size of the second display is larger than the predetermined size, and outputting the second screen data for the second screen to the remote accessing device so as to display the second screen on the second display when the size of the second display is smaller than the predetermined size, wherein the method further comprises storing in advance in a storage medium the first screen data for displaying the first screen and the second screen data for displaying the second screen.

14. The method for displaying a screen in a display unit according to claim 13, wherein the first objects include at least one of a letter, a button, and a tab, and the second objects include at least one of a letter, a button, and a tab.

15. The method for displaying a screen in a display unit according to claim 13, wherein the second objects in the second screen are arranged in a different location than the first objects in the first screen.

16. A non-transitory computer-readable storage medium storing thereon a computer program used in a computer for displaying a screen in a display unit, the computer program causing the computer to perform processing comprising:
selectively switching to displaying on a first display between a first screen based on a first screen data including first objects disposed therein and a second screen based on a second screen data instead of the first screen, the second screen including second objects disposed therein according to user's operation, the second screen corresponding to the first screen so as to have a same purpose as the first screen, and each of the second objects corresponding to any one of the first objects and having a larger size than a corresponding one of the first objects so that the second objects are more accessible to a user in the second screen than the first objects in the first screen, obtaining size data indicating a size of a display surface of a second display provided in a remote accessing device, the remote accessing device remotely accessing the first display, determining whether a size of the second display is larger or smaller than a predetermined size based on the size data, outputting the first screen data for the first screen to the remote accessing device so as to display the first screen on the second display when the size of the second display is larger than the predetermined size, and outputting the second screen data for the second screen to the remote accessing device so as to display the second screen on the second display when the size of the second display is smaller than the predetermined size, wherein the computer program causes the computer to store in advance in a storage medium the first screen data for displaying the first screen and the second screen data for displaying the second screen.

17. The non-transitory computer-readable storage medium according to claim 16, wherein the first screen is designed to have a normal design, and the second screen is designed to have a design for accessibility.

18. The non-transitory computer-readable storage medium according to claim 16, wherein displaying the second screen in the first display control processing includes reducing, if necessary, the second screen to display an entirety of the second screen across the display unit.

19. The non-transitory computer-readable storage medium according to claim 16, wherein, when the size of the display surface is larger than the predetermined size and a user performs predetermined operation, the computer program causes the computer to perform, as the first display control processing, processing for displaying the second screen instead of the first screen in the display unit.

20. The non-transitory computer-readable storage medium according to claim 16, wherein, displaying the second screen in the first display control processing includes, when the size of the display surface is smaller than the predetermined size, adding a selectable object to the second screen to display the second screen in the display unit, and when the selectable object is selected, the computer program causes the computer to perform second display control processing for displaying, in the display unit, a part of the first screen instead of the second screen, or, alternatively, the part of the first screen above a part of the second screen.

21. The non-transitory computer-readable storage medium according to claim 20, wherein the second display control processing includes displaying, in the display unit, a scroll bar together with the part of the screen, and scrolling through the first screen in accordance with operation on the scroll bar.

22. The non-transitory computer-readable storage medium according to claim 16, wherein the first objects include at least one of a letter, a button, and a tab, and the second objects include at least one of a letter, a button, and a tab.

23. The non-transitory computer-readable storage medium according to claim 16, wherein the second objects in the second screen are arranged in a different location than the first objects in the first screen.

* * * * *